United States Patent [19]

Monti

[11] 3,760,106

[45] Sept. 18, 1973

[54] PCM TELECOMMUNICATION SYSTEM WITH TDMA VOICE TRANSMISSION

[75] Inventor: Giancarlo Monti, Milan, Italy

[73] Assignee: Societa Italiana Telecomunicazioni Siemens S.p.A., Milano, Italy

[22] Filed: Apr. 17, 1972

[21] Appl. No.: 244,578

[30] Foreign Application Priority Data

Apr. 15, 1971 Italy .............................. 23212 A/71

[52] U.S. Cl....... 179/15 BA, 179/15 AF, 179/15 BV

[51] Int. Cl. ................................................ H04j 3/00

[58] Field of Search .................... 179/15 BV, 15 BA, 179/15 BC, 15 AF, 15 A, 15 BS, 15 AQ

[56] References Cited

UNITED STATES PATENTS 3,641,273 2/1972 Herold ............................ 179/15 BA

*Primary Examiner*—Ralph D. Blakeslee
*Attorney*—Karl F. Ross

[57] ABSTRACT

A terminal of a pulse-code-modulation (PCM) time-division multiple-access (TDMA) telecommunication system, serving for the exchange of digitized message samples in the form of interleaved multibit pulse codes between a multiplicity of local channels and a like number of remote channels accessible through another terminal, has K associated processing stations each serving *n* 30-channel groups whose incoming lines are sampled by respective group coders. Each station includes a multiplexer for the outputs of respective group coders whose access to the multiplexer is controlled by a gate in response to a binary activity pattern read out from an associated buffer register, this activity pattern being stored in a memory and periodically updated under the control of respective monitoring units which test the instantaneous condition of the several incoming lines feeding each group coder. The gate blocks the inscription of blank codes from inactive lines in a shift register individually assigned to each group, the shift register thus containing only significant pulse codes from active lines which are read out at high speed to the multiplexer together with allocation bits derived from the activity pattern to inform the remote terminal of the origins of the individual pulse codes in a composite word transmitted during a frame of 125 μsec, the frame being divided into a number of subframes each assigned to a respective station and consisting of a predetermined number of time slots established by a programmer; extra bits may be included in each composite word to make up the allotted number of time slots. At the receiving end, the reverse procedure is followed with restoration of the individual pulse codes to their original relative time position, in respective scanning intervals of a frame, prior to their distribution to the outgoing lines for which they are intended.

10 Claims, 6 Drawing Figures

PATENTED SEP 18 1973

3,760,106

SHEET 4 OF 6

PCM TELECOMMUNICATION SYSTEM WITH TDMA VOICE TRANSMISSION

My present invention relates to a PCM (pulse-code modulation) telecommunication system of the time-division multiple-access (TDMA) type in which messages consisting of voice-frequency signals are periodically sampled (e.g., as to amplitude) and translated into digital form, i.e., into multibit pulse codes, for transmission to a remote destination in interleaved relationship with similar multibit codes of other messages traveling over the same signal path.

The intercalation of such messages in a PCM/TDMA system in code-by-code fashion (as distinct from bit-by-bit) has heretofore been accomplished generally at the analog level, before encoding, under the control of monitoring circuits which ascertain the state of activity of each incoming line served by a common terminal and control the transmission of the respective pulse codes in multiplexed form to a remote terminal where the individual pulse codes of the received composite code words are decoded and distributed to their respective destinations.

The general obJect of my present invention is to provide an improved system of this character enabling the encoding and decoding to be carried out at reduced speed, during a time interval many times larger than that allotted to transmission of each pulse code in the composite word, so as to permit the use of simpler digital-analog converters.

Another object of this invention is to provide multiplexing and demultiplexing means in such a system which can be readily adapted to different and varying traffic conditions.

A further object is to eliminate the need for multiplexing and demultiplexing in real time to optimize the efficiency of the TDMA system.

It is also an object of my invention to provide means in such a system for preventing the loss of information through the clipping of message signals upon activation of a hitherto inactive line.

The invention is applicable to a telecommunication system of the aforedescribed type in which at least two terminals are linked by a signal path in order to exchange digitized message samples in the form of multibit pulse codes between local channels served by each terminal, each local channel including an incoming and an outgoing line as seen from that terminal. The channels are combined into groups, a number *n* of such multichannel groups being served by a common processing station. Although, in principle, each terminal need not include more than one such station, the system more fully described hereinafter has K such stations per terminal.

A programmer at the terminal assigns to each station thereof a subframe in a recurring message frame lasting 125 microseconds in the specific example here considered, such a subframe consisting of a multiplicity of time slots sufficient to accommodate bits from all active lines of all *n* groups of the corresponding station under prevailing traffic conditIons. Advantageously, the number of groups *n* is the same for all stations and the number of channels per group is also uniform. The latter number, 30 in the present instance, determines the number of scanning intervals per frame assigned to each of *n* group coders in each station for the sampling of the incoming lines of the associated group, with generation of a significant pulse code for each active line and a blank code for each inactive one. The resulting code sequence is delivered by each coder to a multiplexer and, in parallel therewith, to an associated monitoring unit which determines the presence of significant pulse codes and intervening blank codeS in that sequence and supplies that information to a logic network establishing a binary activity pattern for the incoming lines of each group; the information for this pattern is stored in a transmitting memory and periodically updated to control a gate in an input of the multiplexer so as to block the entry of blank codes into a shift register thereof assigned to the respective group. The logic network also includes an address encoder which feeds a number of allocation bits, based on the activity pattern to the multiplexer, for incorporation into the composite code word to be transmitted to a remote terminal, preferably as a prefix to the pulse codes thereof; the address information represented by these allocation bits, identifying the origins of the individual pulse codes in each composite code word, is advantageously distributed over several frames to reduce the number of time slots per subframe reserved for this purpose. At the remote terminal, the arriving code words are received in a demultiplexer which separates and temporarily stores their individual pulse codes and includes an address decoder indentifying their origins from the accompanying allocation bits which serve to update the address information stored in a receiving memory. Thus, with the aid of destination information previously registered in that memory or in a companion memory upon the initiation of a call between the two terminals, the individual pulse codes of the arriving code words can be distributed to respective group decoders serving the outgoing lines of the channels for which they are intended.

The monitoring unit associated with each group coder preferably includes a digital threshold circuit working into a set of integrators which are charged once per frame, during respective scanning intervals, in order to average the signal level of each incoming line over a period of several message frames, e.g., with a buildup period of 40 frames (5 msec) and a decay period 48 times as long (240 msec). This avoids sudden cut-ins due to spurious voltages and interruptions upon momentary loss of signal. In order to prevent any significant loss of information during the buildup period, I prefer to insert a delay line between the output of group coder and the corresponding multiplexer input to retard their code sequences by a length of time approximately equaling that period.

According to a more particular feature of my invention, the several shift registers of the multiplexer are paired with alike number of buffer registers, one for each group, which receive the activity information of the respective groups once per cycle from the logic network through the transmitting memory and from which this information is read out as a rectangular wave, constituting the activity pattern, by a train of low-rate stepping pulses in the rhythm of the scanning intervals, i.e., at a rate of 30 pulses per frame in the specific instance here assumed. The capacity of each shift register should be sufficient to accommodate a pulse code from each incoming line of the respective group, i.e., a total of 240 bits in a system of 8-bit codes with 30-channel groups, even though all the lines of a given group will be rarely busy at the same time. In the event that the total number of bits in significant pulse codes from all the groups of a processing station should exceed the number of time slots assigned to this station in the corresponding subframe, a supervisory counter halts the sampling of further integrators of that monitoring unit for this particular frame. Usually, the total number of significant codes for the group will not reach the capacity of the shift register; supplemental loading pulses may then be introduced into that register under the control of a code counter, responsive to the activity pattern read out from the buffer register, to advance the pulse code first inscribed in the shift register to a final stage thereof so that the stored codes will begin to issue from the register immediately upon the start of the high-speed readout. The cascaded stages of this shift register advantageously have their storage elements connected for parallel loading from a serially loaded input register and parallel unloading into a serially unloaded output register.

In order to enable instantaneous switchover from the read-out of one shift register to that of another such register assigned to the group ranking next in line, a bit counter also responding to the activity pattern of the buffer register determines the number of high-speed stepping pulses required to clear the first shift register and to initiate the reading of the second register as soon as the first one is empty.

According to a further feature of my invention, the demultiplexer of each terminal includes a multistage register (with 30 stages in the example given) controlled by the associated address decoder to redeploy the individual pulse codes of an arriving code word in respective scanning intervals of a frame, i.e., the intervals which they occupy prior to multiplexing within the originating group. This procedure restores the suppressed blank codes to their time positions within the original code sequence and therefore facilitates the channeling of the significant codes to the proper decoders.

The above and other features of my invention will be described in detail hereinafter with reference to the accompanying drawing in which.

Figure 1:
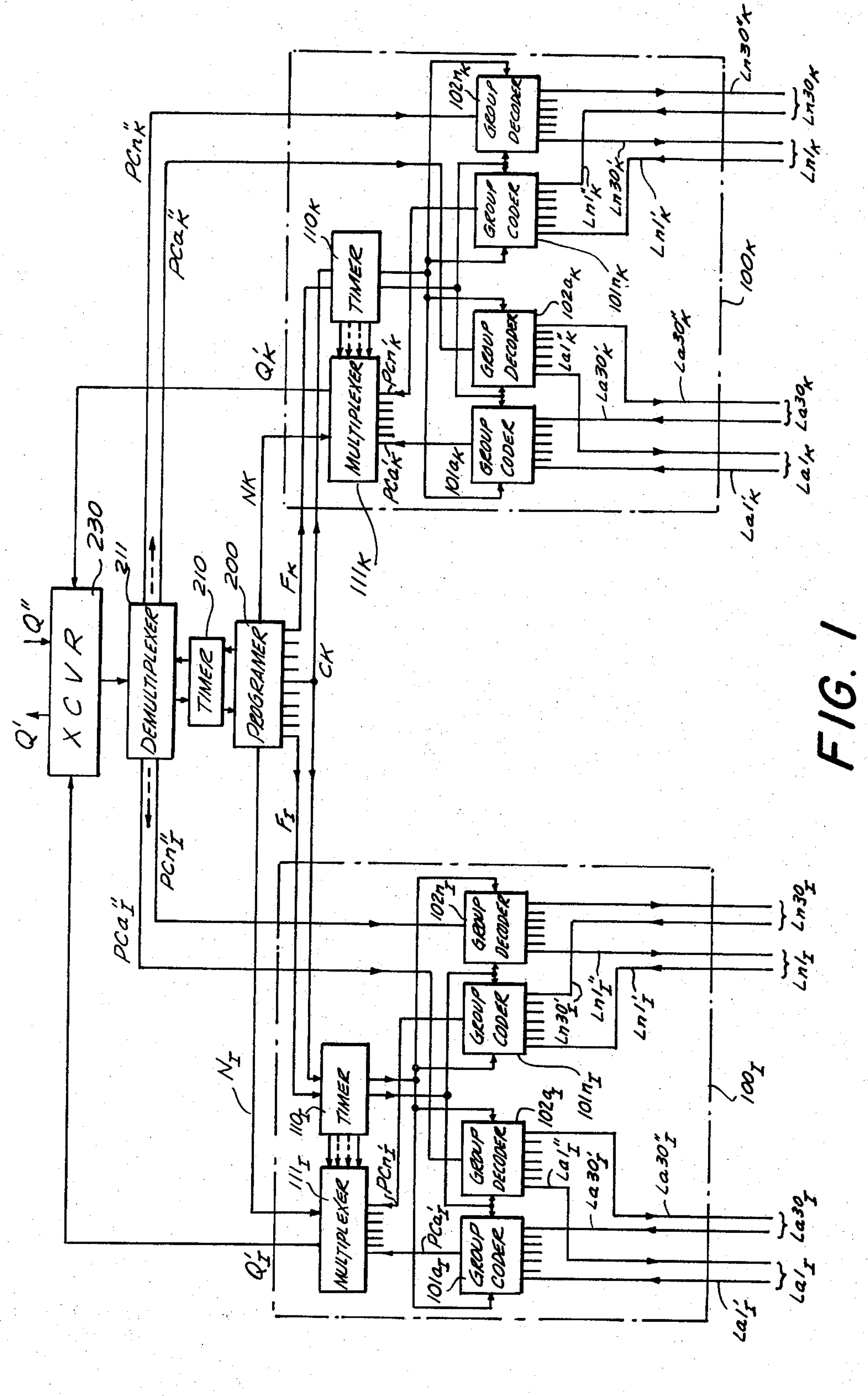
FIG. 1 is an overall block diagram of a terminal of a voice-frequency telecommunication system embodying my invention.

In FIG. 1 I have shown a terminal of a PCM telecommunication system including a signal path leading to a similar remote terminal, this signal path being schematically represented by a pair of conductors labeled Q', Q'' in conformity with the designations of respective code words transmitted and received over that path. Associated with this terminal are a plurality K of processing stations of which only the first one, labeled $100_I$, and the last one, designated $100_K$, have been illustrated; all these stations are substantially identical, with the possible exception of the number of time slots allotted to them in respective sub-frames $SF_I$, $SF_{II}$, $SF_{III}$ . . . $SF_K$ (FIG. 2) of a message frame FR. Each station is a junction of a multiplicity of local channels divided into *n* groups of 30 channels each. The channels of the first and last groups of station $100_I$ have been designated $La1_I$ – $La30_I$ and $Ln1_I$ – $Ln30_I$, those of corresponding groups of station $100_K$ having been analogously indicated at $La1_K$ – $La30_K$ and $Ln1_K$ – $Ln30_K$. Each channel includes an incoming line $La1_I'$ . . . $Ln30_K'$ and an outgoing line $La1_I''$ – $Ln30_K''$. The incoming lines $La1_I'$, $La30_I'$ and $Ln1_I'$, $Ln30_I'$ of the first and last groups of station $100_I$ terminate at respective group coders $101a_I$ and $101n_I$, the intermediate group coders having not been illustrated; the corresponding incoming lines $La1_K'$, $La30_K'$ and $Ln1_K'$, $Ln30_K'$ of station $100_K$ are provided with similar group coders $101a_K$ and $101n_K$. The outgoing companion lines $La1_K''$ – $La30_K''$, $Ln1_K''$ – $Ln30_K''$ of station $100_K$ extend from respective group decoders $102a_I$, $102n_I$ and $102a_K$, $102n_K$, the intervening group decoders having also been omitted in the drawing.

A timer $110_I$ in station $100_I$ controls the operation of all its group coders and decoders as well as that of a multiplexer $111_I$ receiving the outputs of all associated group coders $101a_I$ – $101n_I$; a corresponding timer and multiplexer have been illustrated at $110_K$, $111_K$ in station $100_K$.

A programmer 200, forming part of the central terminal equipment, controls the timers $110_I$ – $110_K$ as well as a central timer 210 driving a demultiplexer 211 to which code words Q'' of arriving message frames are fed by a transceiver 230. Departing code words $Q_I'$ – $Q_K'$ are delivered to transceiver 230 by the multiplexers $111_I$ – $111_K$ of the several associated stations.

Figure 2:
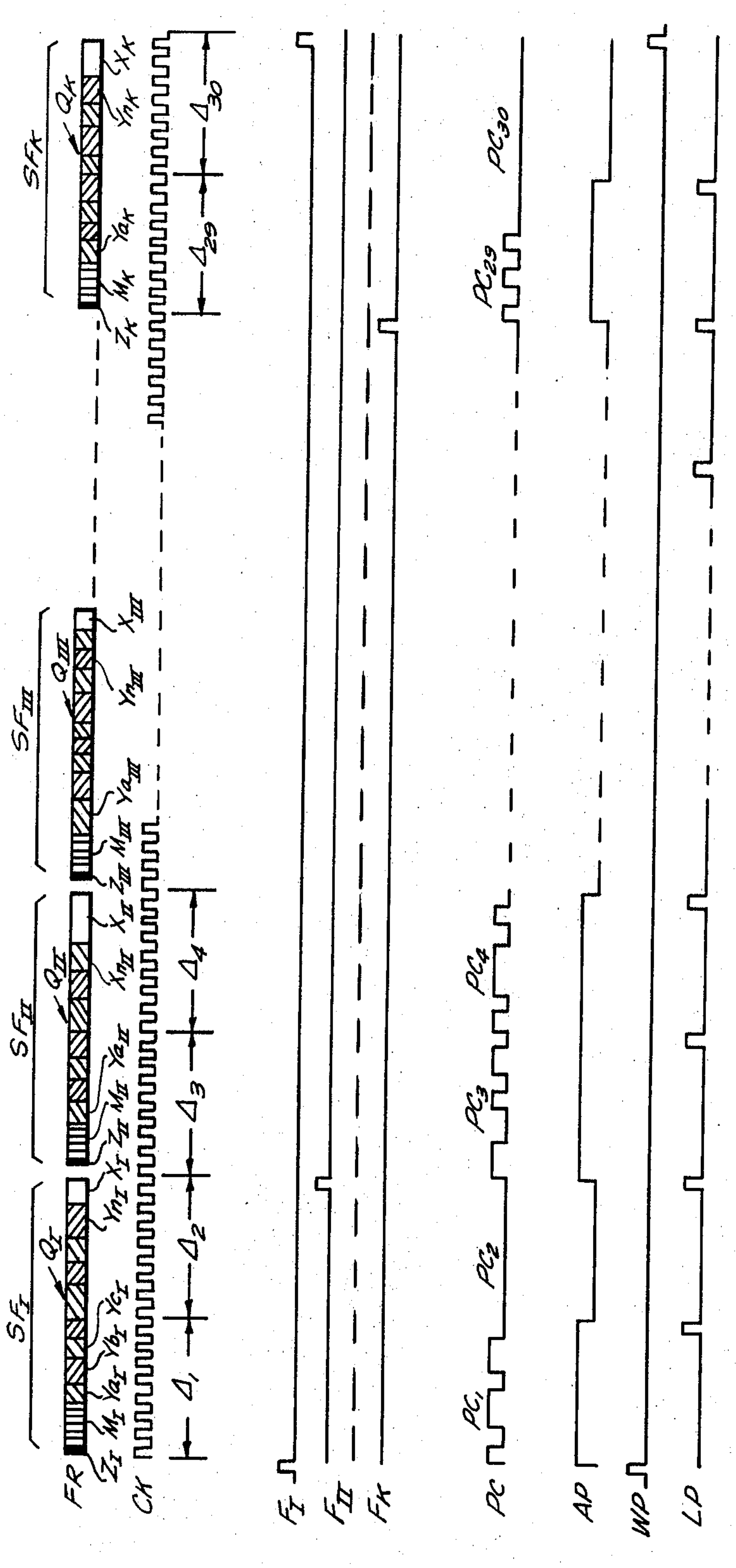
FIG. 2 is a set of graphs serving to explain the operation of the system of FIG. 1.

The programmer 200 feeds reference pulses $F_I$ – $F_K$ to timers $110_I$ – $110_K$ to start their operation at the beginning of respective subframes, as illustrated in graphs $F_1$, $F_2$, $F_K$ (FIG. 2). The programmer further supplies a continuous train of clock pulses CK to these timers; as illustrated in FIG. 2, these clock pulses recur at a rate of 240 per frame, i.e., eight pulses during each of 30 scanning intervals $\Delta_1$ – $\Delta_{30}$ respectively assigned to the channels of each group during a frame cycle.

The voice currents arriving over the incoming lines of any group are sampled, during the assigned scanning interval, by the corresponding group coder and converted into an 8-bit pulse code $PC_1$ – $PC_{30}$ forming part of a code sequence PC emitted by that group coder. In the example illustrated in FIG. 2 this code sequence PC contains significant pulse codes $PC_1$, $PC_3$, $PC_4$, . . . $PC_{29}$, originating at active lines, interspersed with blank codes $PC_2$, . . . $PC_{30}$ in the time positions of inactive lines. The addresses of the active lines are indicated to the remote terminal by an allocation message, distributed over a succession of frames referred to as a superframe; several bits of this allocation message are included in each composite code word $Q_I$, $Q_{II}$, $Q_{III}$ . . . $Q_K$ emitted by the multiplexers, as illustrated at $M_I$, $M_{II}$, $M_{III}$ . . . $M_K$. These allocation bits precede, in each composite code word, the individual group codes $Ya_I$, $Yb_I$, $Yc_I$, . . . $Yn_I$ of the first word $Q_I$ and similar group codes $Ya_{II}$ – $Yn_{II}$, $Ya_{III}$ – $Yn_{III}$, . . . $Ya_K$ – $Yn_K$ of the other composite words included in the common frame. A synchronizing bit $Z_I$, $Z_{II}$, $Z_{III}$, . . . $Z_K$ precedes the allocation bits; supplemental bits $X_I$, $X_{II}$, $X_{III}$, . . . $X_K$ complete the count of the assigned time slots in each subframe.

Upon integration of the bits of each pulse code in the sequence PC over a period equaling a substantial number of consecutive frames, e.g., 40 such frames as noted above, I obtain an activity pattern AP distinctly indicating the relative time posistions of all active and inactive lines in the scanning cycle of a particular group, this scanning cycle being coextensive with the frame FR. This activity pattern is stored, as described hereinafter with reference to FIGS. 3 and 4, in a buffer register individual to each group as illustrated at 112*a* in FIG. 4. The broad rectangular pulses constituting the binary pattern AP, occupying respective scanning intervals, appear during these intervals in the output of the buffer register which is advanced by low-rate stepping pulses LP under the control of the timer. A zero potential in this pattern, indicating the simultaneous transmission of a blank pulse from the output of the corresponding group coder, prevents that blank pulse from loading a 30-stage shift register in the multiplexer, one such shift register having been indicated at 113*a* in FIG. 4 and forming part of one of *n* storage units 114*a* – 114*n* partly illustrated in FIG. 3 for a generic multiplexer 111 of any processing station.

Figure 3:
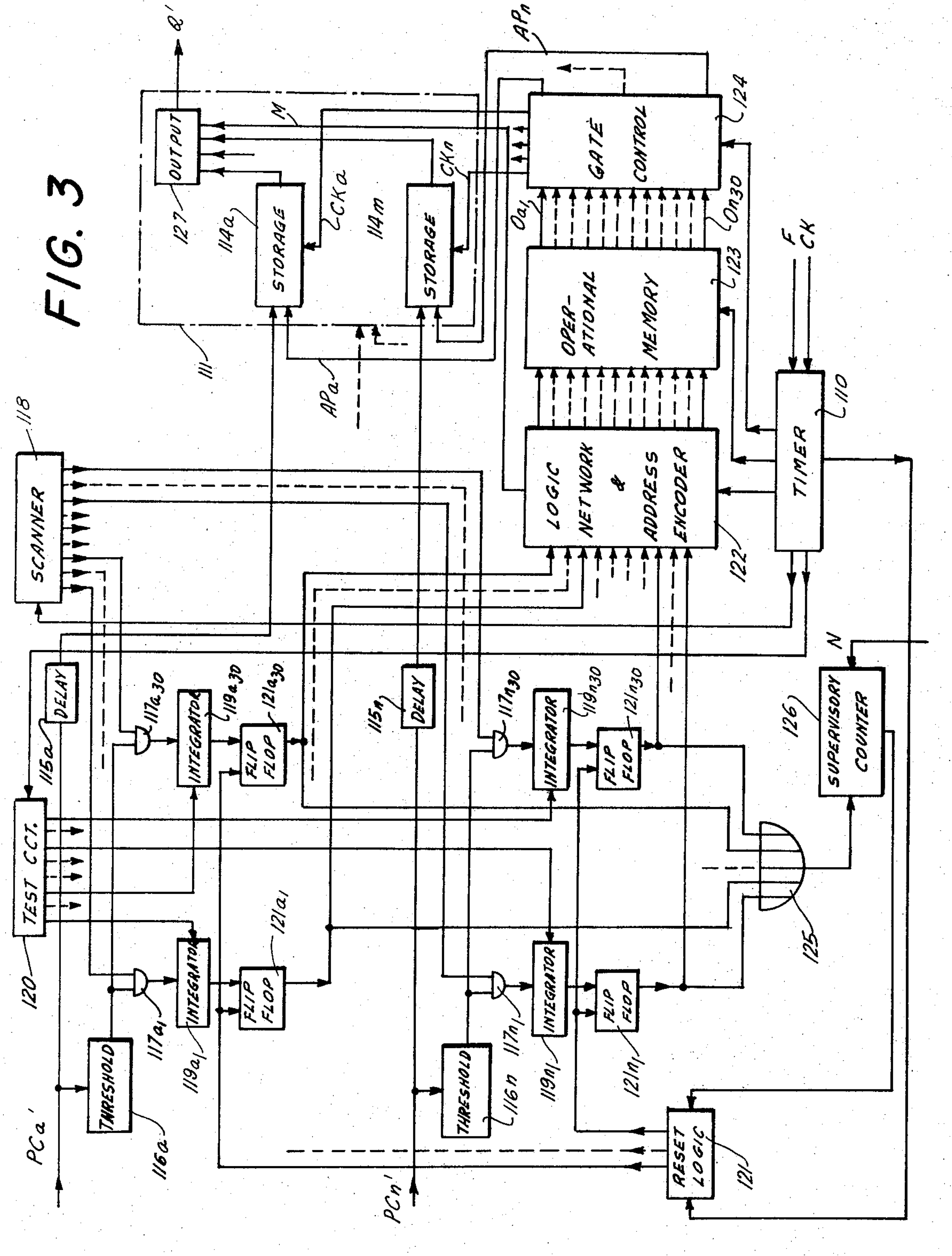
FIG. 3 is a more detailed view of a multiplexer and associated circuitry forming part of the system of FIG. 1.

The code sequence PC of FIG. 2 has been designated, in FIG. 1, $PCa_I' - PCn_I'$ for the outputs of group coders $\mathbf{101}a_I - \mathbf{101}n_I$ and $PCa_K' - PCn_K'$ for the outputs of group coders $\mathbf{101}a_K - \mathbf{101}n_K$. In FIG. 3 the first and the last of these pulse sequences of a generic station have been indicated at PC*a*′ and PC*n*′. Code sequence PC*a*′ is delivered to storage unit 114*a* of multiplexer 111 via a delay network 115*a*, with a delay time of 5 msec in this example, and is fed in parallel therewith to a threshold circuit 116*a* working into 30 parallel AND gates $\mathbf{117}a_1 - \mathbf{117}a_{30}$. These AND gates are sequentially unblocked by a scanner 118 so as to conduct during respective intervals $\Delta_1 - \Delta_{30}$ if threshold circuit 116*a* has an output, i.e., if a significant pulse code is present in its input. Corresponding elements for processing the pulse sequence PC*n*′ have been analogously designated with substitution of the postscript *n* for *a* and need not be described in detail.

Each AND gate $\mathbf{117}a_1 - \mathbf{117}a_{30}$ works into a respective integrator $\mathbf{119}a_1 - \mathbf{119}a_{30}$ which is periodically enabled by a timer-controlled test circuit 120, once per superframe, to update the activity information available to the multiplexer. This activity information is stored in a set of flip-flops $\mathbf{121}a_1 - \mathbf{121}a_{30}$ which are set by the respective integrators and are periodically reset, once per superframe, in the same sequence of the enablement of the integrators, by a logic network 121 also controlled from timer 110. This timer further controls the scanner 118 as well as a logic network 122, an operational memory 123 and a gate-control unit 124 which together determine the operation of multiplexer 111. Memory 123 has a multiplicity of outputs $\mathbf{0}a_1 - \mathbf{0}n_1$ leading to controller 124. Logic network 122 includes an address encoder which receives the settings of all the flip-flops $\mathbf{121}a_1 - \mathbf{121}a_{30} \ldots \mathbf{121}n_1 - \mathbf{121}n_{30}$ to establish the activity pattern AP shown in FIG. 2. The fip-flops also work through an OR gate 125 into a supervisory counter 126 receiving as a reference parameter the numerical value N ($N_1 - N_K$ in FIG. 1) which represents the number of time slots assigned for message bits in the corresponding subframe; if that number is reached by the total number of flip-flops $\mathbf{121}a_1 - \mathbf{121}n_{30}$ simultaneously set, logic network 121 is actuated to reset all the flip-flops so as to halt the loading of the multiplexer 111. The instantaneous output of the address encoder in network 112, representing the allocation bits $M_I$ etc. of FIG. 2, is supplied to an output stage 127 of the multiplexer together with the series of significant codes read out from storage units 114*a* – 114*n*, thereby generating the composite word Q′ emitted by this multiplexer.

Figure 4:
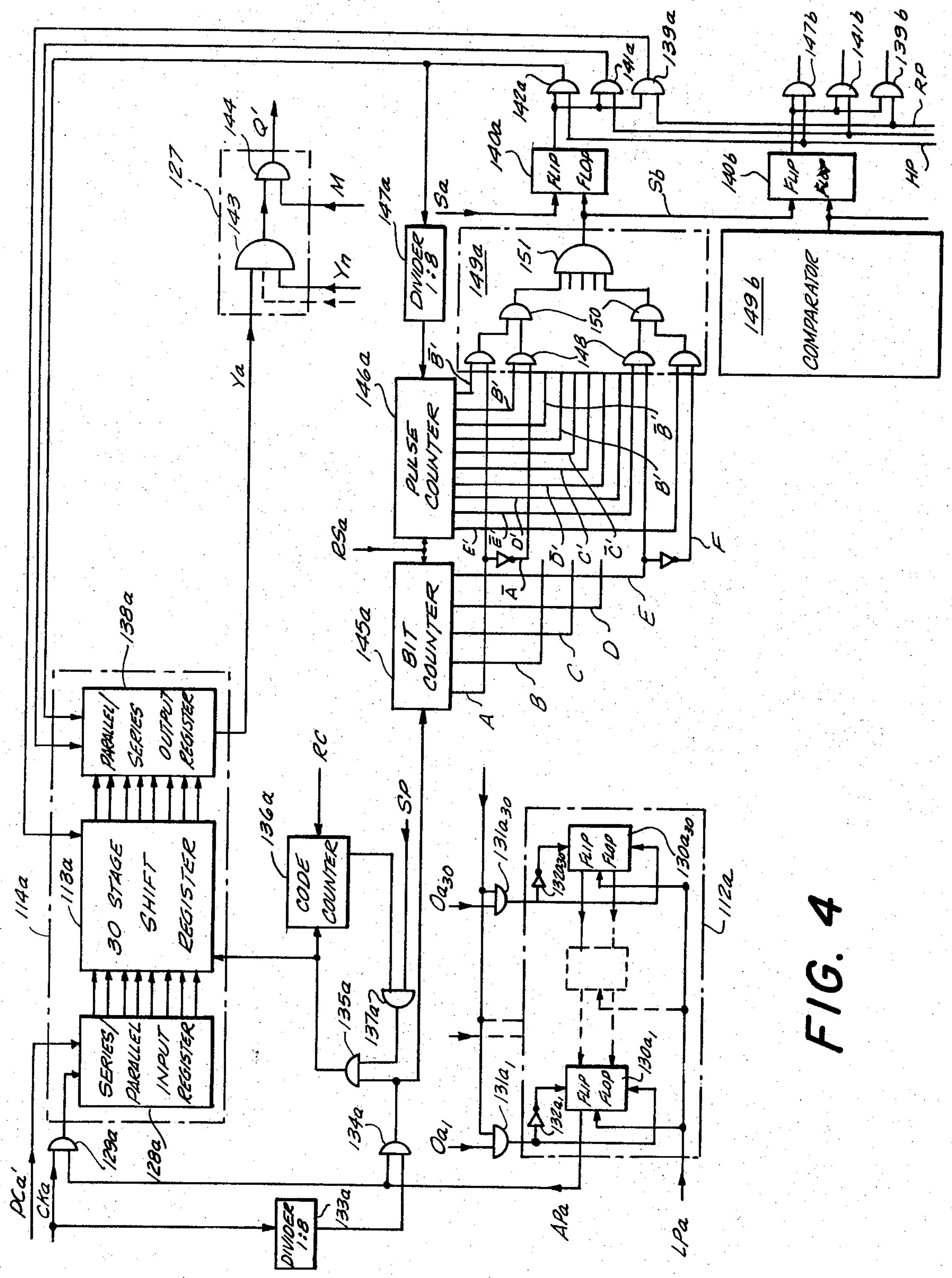
FIG. 4 shows further details of some of the components illustrated in FIG. 3.

Reference will now be made to FIG. 4 which shows details of unit 114*a* including the 30-stage shift register 113*a*. Each stage of this shift register consists of eight parallel storage elements connected to be loaded from an input register 128*a* of the series/parallel type to which the pulses PC′ are serially fed in the presence of a consent signal emitted by an AND gate 129*a*. This gate receives, during the assigned scanning interval, the clock pulses CK*a* as well as the output of buffer register 112*a*; the latter has 30 stages in the form of flip-flops $\mathbf{130}a_1 - \mathbf{130}a_{30}$ whose setting and resetting inputs are connected to the outputs of respective AND gates $\mathbf{131}a_1 - \mathbf{131}a_{30}$ with interposition of inverters $\mathbf{132}a_1 - \mathbf{132}a_{30}$ in the case of their resetting inputs. Each AND gate has one input connected to the timer 110 for energization by the writing pulse WP, its other input receiving a respective output $\mathbf{0}a_1 - \mathbf{0}a_{30}$ from operational memory 123 in the event that the corresponding local line has been found active. Thus, writing pulse WP simultaneously sets all the flip-flops of buffer register 112*a* respresenting active lines, the remaining flip-flops being reset at that instant. If the first flip-flop $\mathbf{130}a_1$ is set, it opens the AND gate 129*a* to the eight clock pulses CK*a* arriving from the group coder during the first scanning interval $\Delta_1$, thereby enabling the entry of the corresponding pulse code into the shift register 113*a*. Otherwise, register 113*a* remains empty until the setting of a subsequent flip-flop is communicated to flip-flop $\mathbf{130}a_1$ after one or more stepping pulses LP*a*. Thus, register 113*a* receives only the code pulses PC*a*′ of the active lines of its group.

A binary frequency divider 133*a* receives the clock pulses CK*a* and energizes an input of an AND gate 134*a* on every eighth of these clock pulses, the other input of this AND gate receiving the activity pattern AP*a* from register 112*a*. In the presence of voltage in the output of that register, AND gate 134*a* conducts and transmits a stepping pulse through an OR gate 135*a* to shift register 113*a* and in parallel therewith to a code counter 136*a*. The latter has a capacity of 30 pulses, corresponding to the number of stages of shift register 113*a*, and receives supplemental stepping pulses SP from timer 110 at the end of each frame to advance the stored codes in register 113*a* to the final stage thereof if that register is not fully loaded; stepping pulses SP reach the register 113a and the counter 136*a* through OR gate 135*a* by way of an AND gate 137*a* having an inverting input connected to an output lead of the counter so that these pulses are blocked when the full count has been reached.

In order to facilitate the filling of register 113 by the supplemental pulses SP, this register may in practice consist of two sections of the same storage capacity (240 bits), the contents of the first section being transferred at the end of each frame to the second section from which they are subsequently read out to an output register 138*a* of the parallel/series type. This readout is accomplished by a series of stepping pulses RP from timer 110 delivered to register 113*a* through an AND gate 139*a* when the latter is made conductive by the setting of a flip-flop 140*a* in response to a pulse S*a* from the timer. Flip-flop 140*a* also controls two other AND gates 141*a* and 142*a*; gate 141*a* receives a reception-enabling pulse EP from the timer whereas gate 142*a* is energized by a series of high-rate pulses HP designed to discharge the register 138*a* during a small fraction of the assigned subframe. The resulting pulse train Y*a* is delivered to an OR gate 143 in output stage 127 to which the pulse trains of the other groups of this station, including the train Y*n* of the last group, are also fed. OR gate 143 works into another OR gate 144 receiving the allocation bits M from the address encoder in the network 122 of FIG. 3.

A bit counter 145*a* receives the pulses passed by AND gate 134*a* and determines from them the number of pulse codes stored in register 113*a*. The number of high-rate readout pulses HP reaching the register 138*a* is determined by a pulse counter 146*a* which is advanced by every eighth of these pulses through the intermediary of a binary divider 147*a*. Counter 145*a* has five stage outputs A, B, C, D, E connected, directly and through inverters, to inputs of 10 AND gates 148 (only partly illustrated) in a comparator 149*a*. These AND gates also receive direct and inverted stage outputs A′ – E′, $\overline{A}'$ – $\overline{E}'$ of counter 146*a* and, through five OR gates 150, work into an AND gate 151. Upon detecting a match between the respective counts of units 145*a* and 146*a*, comparator 149*a* resets the flip-flop 140*a* and delivers a setting pulse S*b* to a similar flip-flop 140*b* controlled by comparator 149*b* which is associated with the second multichannel group of the station here considered. Flip-flop 140*b* directs the pulses AP, EP, HP through respective AND gates 139*b*, 141*b* and 142*b* to the shift and output registers of the next storage unit; in like manner, all the remaining storage units of the multiplexer 111 are consecutively activated to generate the composite word Q′.

Code counter 136*a* also consists of two identical sections, the transfer of the count from the first to the second section and the simultaneous clearing of the first section being accomplished by a resetting pulse RC emitted once per frame by the timer. Counters 145*a* and 146*a* are reset by a pulse RS*a* upon termination of the high-speed readout.

Figure 5:
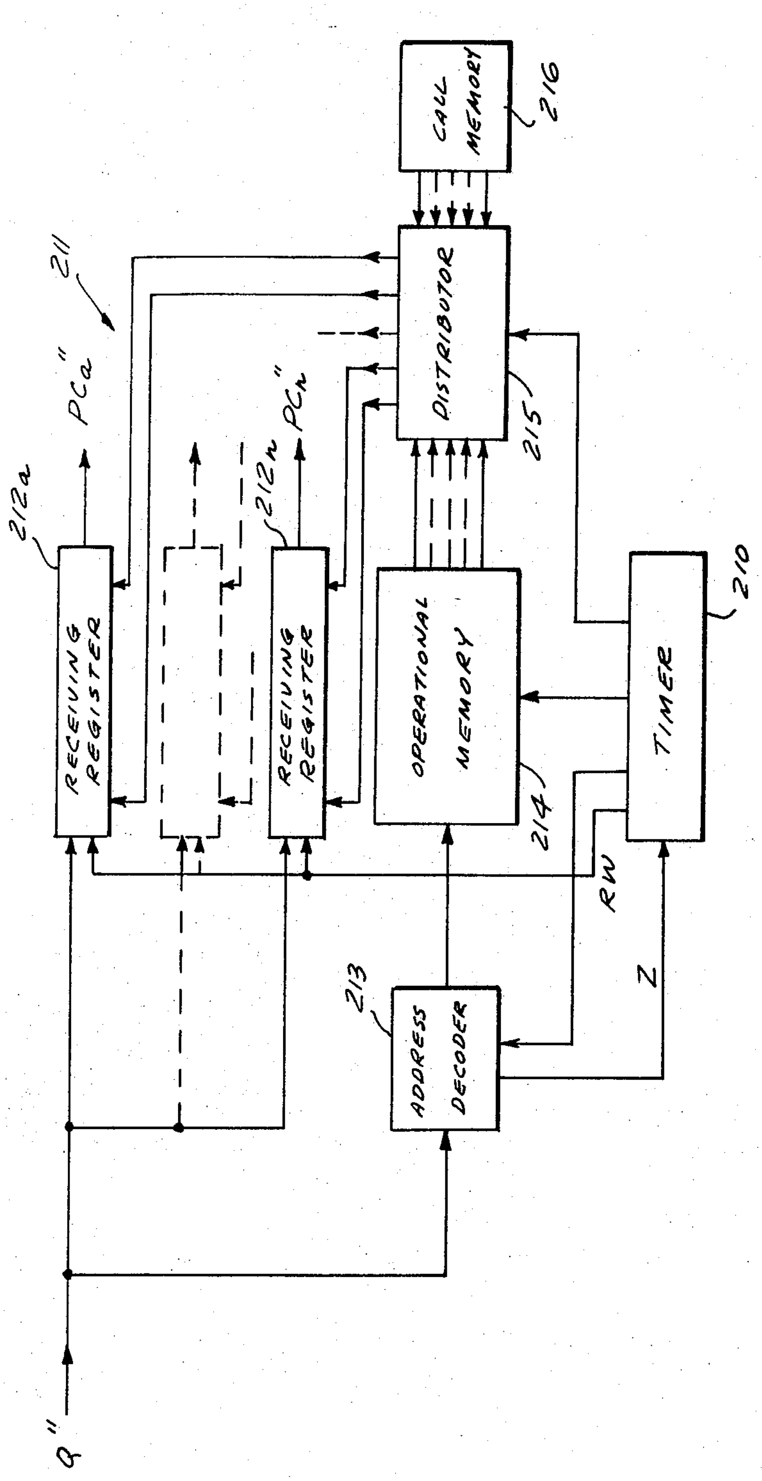
FIG. 5 is a block diagram of a demultiplexer and associated circuitry included in the system of FIG. 1.

In FIG. 5 I have shown the demultiplexer 211 together with the associated timer 210. The demultiplexer includes a series of receiving registers 212*a* – 212*n* to which the incoming code words Q″ are fed in parallel; the arriving pulse train also reaches an address decoder 213 which is controlled by timer 210 together with an operational memory 214 and a distributer 215. The synchronizing bit Z is delivered by the address decoder 213 to the timer to indicate the beginning of a new subframe; a separate synchronizing code may be used at the start of each frame. The timer 210 is thus able to convey to distributor 215 the information necessary for determining which station of the remote terminal is the source of the composite word being processed.

Distributor 215 also receives information from a call memory 216 as to the destination of each pulse code in the arriving word. This information, along with the output of memory 214 as periodically updated by address decoder 213, enables the distributor 215 to redeploy the received code pulses in the appropriate register so as to restore their original relative time positions. Registers 212*a* – 212*n* are jointly controlled by read/write pulses RW from timer 210; their outputs are pulse codes PC*a*″ – PC*n*″ (cf. FIG. 1).

Figure 6:
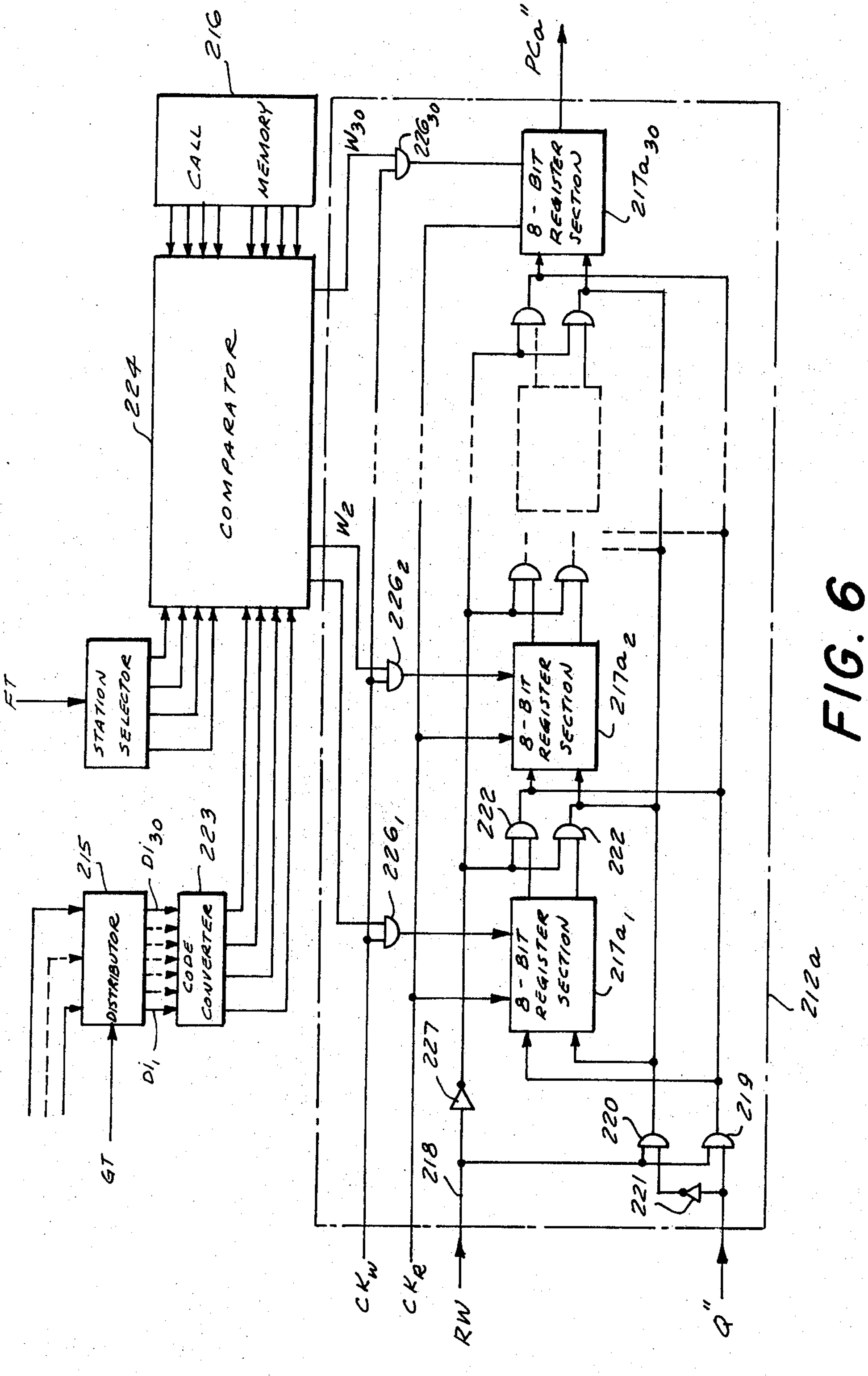
FIG. 6 shows details of some of the components illustrated in FIG. 5.

Details of register 212*a*, representative of any of the receiving registers shown in FIG. 5, have been illustrated in FIG. 6. The register comprises 30 8-bit sections 217*a*$_1$, 217*a*$_2$ . . . 217*a*$_{30}$ which can be loaded in parallel by the codes of sequence Q″ in writing condition, i.e., in the energized condition of a lead 218 receiving the pulse RW, through a pair of AND gates 219, 220 and an inverter 221. Upon the de-energization of lead 218, an inverter 227 unblocks pairs of interstage AND gates 222 to permit the serial readout of the register stages.

Distributor 215 has 30 outputs DI$_1$ – DI$_{30}$ which are energized during successive scanning intervals of the incoming frame, under the control of a timing pulse GT, to the extent that, on the basis of the received address information from decoder 213, these intervals are assigned to active lines at the remote terminal. A code converter 223 feeds the binary equivalent of the order number of each scanning interval to a comparator 224 also obtaining from a station selector 225, controlled by a timer pulse FT, the binary designation of the station from which pulses are being received. Comparator 224 matches these binary numbers with the information delivered to it by call memory 216 and, upon detecting any match, energizes one of 30 outputs W$_1$, W$_2$, . . . W$_{30}$ to unblock a corresponding AND gate 226$_1$, 226$_2$, . . . 226$_{30}$ for the passage of a clock pulse $CK_W$ controlling the actual writing. Another clock pulse $CK_R$ controls the readout of register 212*a*, resulting pulse sequence PC*a*″ including blank codes from those register stages whose AND gates 226$_1$ etc. were not opened by the comparator 224.

Distributor 215 is essentially a logic matrix with a multiplicity of OR gates feeding its outputs DI$_1$ – DI$_{30}$. Distributors of this general nature are disclosed, for example, in commonly owned U.S. Pat. No. 3,581,016; see also Italian Pat. No. 800,811. Digital thereshold circuit 116*a* may be of the type disclosed in commonly owned U.S. Pat. No. 3,560,662. A telecommunication system of the general character here described has also been disclosed in copending applications Ser. No. 216,979, filed Jan. 11, 1972 by Isidoro Poretti, and Ser. No. 212,514, filed Dec. 27, 1971 by said Paolo Fornasiero and Sergio Tomasi.

I claim:

1. In a PCM voice-frequency telecommunication system with at least two terminals linked by a signal path for exchanging digitized message samples in the form of multibit pulse codes between local channels served by each terminal, each local channel including and incoming line for the delivery to the associated terminal of messages destined for transmission over said signal path and an outgoing line for receiving messages arriving at said associated terminal over said signal path, the improvement wherein each terminal comprises:

at least one processing station provided with a plurality of group coders for the incoming lines of respective groups of local channels and with a plurality of group decoders for the outgoing lines thereof;

programming means assigning to all said groups a predetermined number of time slots in a recurrent message frame;

timing means individual to said station controlled by said programming means for dividing each message frame into a number of scanning intervals corresponding to the number of channels per group and for operating each group coder to sample all the incoming lines of its group during respective intervals to generate a sequence of incoming significant pulse codes from active lines interspersed with blank codes from inactive lines;

monitoring means connected to said group coders for determining the presence of a significant pulse code from each group in any of said scanning intervals;

logical circuitry connected to said monitoring means for establishing a binary activity pattern for the incoming lines of each group;

multiplexing means having access to said coders for combining their outputs into a composite code word occupying at least part of the assigned time slots in said message frame;

gating means controlled by said logical circuitry for selectively blocking the access of said multiplexing means to said group coders in response to said activity pattern to prevent the inclusion of blank codes from inactive lines in said composite code word;

address-encoding means in said logical circuitry connected to said multiplexing means for accompanying said composite code word with allocation bits conveying activity information in response to said activity pattern;

transceiving means connected to said multiplexing means for transmitting successive message frames including said composite code word over said signal path to a remote terminal;

demultiplexing means connected to said transceiving means for separating and temporarily storing individual pulse codes of an arriving code word;

address-decoding means in said demultiplexing means responsive to the allocation bits of arriving code words for deriving therefrom the identity of the origins of their individual pulse codes; and distributing means controlled by said address-decoding means for directing said individual pulse codes to the group decoders of respective local channels.

2. The improvement defined in claim 1 wherein said monitoring means includes a plurality of digital threshold circuits each connected to the output of a respective group coder, in parallel with respective inputs of said multiplexing means, and a set of integrating circuits in the output of each threshold circuit sequentially enabled by said timing means during respective scanning intervals for ascertaining the presence of bits on any given line during successive frames in an extended buildup period.

3. The improvement defined in claim 2, further comprising delay means inserted between said group coders and said respective inputs of said multiplexing means for retarding their sequences of significant pulse codes by a length of time substantially equaling said buildup period.

4. The improvement defined in claim 1 wherein said terminal includes a plurality of stations each assigned a subframe of predetermined length in a message frame, the timing means individual to said stations being cyclically actuated by said programming means during their respective subframes.

5. The improvement defined in claim 1 wherein said multiplexing means comprises a plurality of shift registers, one for each group, and a like plurality of buffer registers connected to said logical circuitry for receiving therefrom the activity patterns of the respective groups during each message frame, said timing means including a source of low-rate stepping pulses for reading out the activity pattern of each buffer register in the rhythm of said scanning intervals, said gating means comprising an individual gate for each of said shift registers controlled by the respective buffer register, each shift register having a capacity for simultaneous inscription of a pulse code from each incoming line of the respective group, said timing means further including a source of high-speed stepping pulses for reading out the contents of each shift register during a fraction of the number of time slots assigned to all the groups of said station.

6. The improvement defined in claim 5 wherein said timing means further includes a source of supplemental loading pulses for each of said shift registers effetive upon completion of the readout of the corresponding buffer register to advance the first pulse code inscribed in the shift register to a final stage thereof.

7. The improvment defined in claim 6 wherein each of said shift registers has a series of stages each with a multiplicity of storage elements for the parallel entry of the bits of each pulse code, said multiplexing means further including code-counting means responsive to the number of significant pulse codes indentified by said activity pattern for determining the requisite number of said supplemental loading pulses.

8. The improvement defined in claim 5 wherein said multiplexing means further includes supervisory counting means responsive to the total number of significant pulse codes in all said buffer registers for halting the operation of said monitoring means upon said total number exceeding said predetermined number of assigned time slots.

9. The improvement defined in claim 5 wherein said multiplexing means further includes bit-counting means responsive to the number of significant codes identified by said activity pattern for determining the requisite number of said high-speed stepping pulses and switchover means for terminating the readout of one shift register and starting the readout of another shift register under the control of said bit-counting means.

10. The improvement defined in claim 1 wherein said demultiplexing means includes multistage register means controlled by said address-decoding means for redeploying the individual pulse codes of an arriving code word in respective scanning intervals assigned to their originating channels within the corresponding groups.

* * * * *